United States Patent [19]  [11]  4,376,093
Prengaman  [45]  Mar. 8, 1983

[54] LOW ANTIMONY ALLOY

[75] Inventor: Raymond D. Prengaman, Arlington, Tex.

[73] Assignee: RSR Corporation, Dallas, Tex.

[21] Appl. No.: 270,134

[22] Filed: Jun. 3, 1981

[51] Int. Cl.³ .................... C22F 11/10; C22C 11/08
[52] U.S. Cl. .................................. 420/573; 420/567; 420/568; 420/569; 420/571; 420/572; 429/149
[58] Field of Search ............... 75/166; 420/573, 567, 420/568, 569, 571, 572

[56]  References Cited

U.S. PATENT DOCUMENTS

| | | | |
|---|---|---|---|
| 682,330 | 4/1901 | Leyendecker | 75/166 B |
| 1,021,997 | 2/1912 | Morrison | 429/245 |
| 1,674,958 | 6/1928 | Dean et al. | 75/166 B |
| 2,841,491 | 7/1958 | Zahn | 75/166 |
| 2,993,785 | 7/1961 | Borchers et al. | 75/166 |
| 3,287,165 | 11/1966 | Jensen | 136/65 |
| 3,879,217 | 4/1975 | Peters | 75/166 B |
| 3,912,537 | 10/1975 | Peters | 75/166 R |
| 3,990,893 | 11/1976 | Nijhawan et al. | 75/166 C |
| 3,993,480 | 11/1976 | Ueberschaer et al. | 75/166 C |
| 4,113,477 | 9/1978 | Nees et al. | 75/166 C |
| 4,158,563 | 6/1979 | Hebbar et al. | 75/166 C |
| 4,159,908 | 7/1979 | Rao et al. | 75/167 |
| 4,310,353 | 1/1982 | Nann et al. | 75/166 C |

FOREIGN PATENT DOCUMENTS

| | | |
|---|---|---|
| 542499 | 8/1957 | Canada . |
| 2826590 | 1/1980 | Fed. Rep. of Germany . |
| 473911 | 11/1937 | United Kingdom . |

*Primary Examiner*—Veronica O'Keefe

[57]  ABSTRACT

Low antimony lead alloys suitable for use as grid material in maintenance-free high capacity lead acid batteries are disclosed. The alloys comprise 0.6 to 1.1 weight percent antimony, 0.06 to 0.25 weight percent arsenic, 0.1 to 0.4 weight percent tin, 0.06 to 0.11 weight percent copper, and the balance lead. A preferred alloy contains 0.8 weight percent antimony, 0.15 weight percent arsenic, 0.25 weight percent tin and 0.08 weight percent copper.

2 Claims, No Drawings

4,376,093

LOW ANTIMONY ALLOY

BACKGROUND OF THE INVENTION (a) Field of Invention

This invention relates to lead alloys having a low antimony content and containing arsenic, tin and copper. The alloys have utility in high capacity, maintenance-free battery grids.

(b) State of the Art

Lead-antimony alloys have been used as grid materials for lead acid batteries. Antimony is used to increase the strength and/or other physical properties of lead, thereby facilitating various aspects of battery manufacture. In the case of lead-acid battery grids, this is particularly important in order for the grids to withstand normal handling during battery manufacturing and service.

The battery industry has begun producing batteries which require little or no maintenance, such as addition of water to maintain the electrolyte level during the service life of a battery. In such batteries it is the practice to either seal the battery or use vent plugs for the filling ports which are not easily removed by the ultimate battery user. Since the purpose of such batteries is to eliminate the need for filling, a lead alloy system must be selected in which the supply of electrolyte will not be significantly diminished over the intended life of the battery. The presence of antimony typically causes excessive gas generation in lead-acid batteries, especially during the periods of charging or overcharging, which ultimately depletes the quantity of electrolyte. Such gassing is unacceptable in reduced or no-maintenance batteries particularly if they are of the completely sealed type.

Alloys containing no antimony, such as lead-calcium-tin, lead-strontium-tin-aluminum, and lead-calcium-tin-aluminum alloys, have been introduced as maintenance-free battery grid alloys to meet the requirements of cold cranking performance of the batteries. Lead-antimony alloys having above 2.5% antimony are not adequate for high capacity, maintenance-free battery grid alloys; rather, the antimony content must be further reduced to reduce water loss or gassing in batteries during charging and increase the conductivity of the grid alloy, thus increasing the cold cranking performance of the battery. However, elimination of antimony from the battery can result in formation of nonconducting layers at the grid-active material interface, thereby reducing battery performance.

According to the lead-antimony phase diagram, the freezing range becomes a maximum at about 3.5% antimony and antimony alloys containing less than 3.5% antimony should have reduced freezing range and no eutectic liquid. In fact, the amount of eutectic liquid is greatly reduced. However, because of segregation effects during solidification, some eutectic may be present in alloys of 1% antimony or less, indicating that the freezing range, instead of becoming narrower, becomes wider as the antimony content is decreased. The combination of increased freezing range and reduced eutectic liquid makes alloys in the 1-2% antimony content range very difficult to cast without cracking. To permit the use of alloys in this range, resort has been had to addition of nucleants, such as selenium, sulphur, copper, phosphorous, or aluminum, to prevent cracking. In these alloys, problems of temperature control, loss of nucleants and adverse reactions may occur and lead to loss of the alloying elements in use and produce cracking.

It has now been discovered that by restricting the antimony content of alloys to less than 1.1%, both the freezing range and amount of eutectic material are reduced. However, where such alloys are cast as battery grids, at the grid intersections or points where there are large differences in cross section which can cause solidification at different rates, some cracking can still occur due to concentration of eutectic liquid. It has further been discovered that such cracking can be eliminated by the addition of copper to the alloy. The low antimony alloys of the invention are suitable for use as battery grids in maintenance-free, high capacity batteries.

SUMMARY OF THE INVENTION

This invention provides a low antimony alloy which comprises 0.6 to 1.1 weight percent antimony, preferably 0.8 weight percent antimony, 0.06 to 0.25 weight percent arsenic, preferably 0.15 weight percent arsenic, 0.1 to 0.4 weight percent tin, preferably 0.25 weight percent tin, 0.06 to 0.11 weight percent copper, preferably 0.08 weight percent copper, and the balance lead. The alloys are suitable for use in the grids of maintenance-free high capacity lead acid batteries.

DETAILED DESCRIPTION OF THE INVENTION

The present invention provides low antimony lead alloys for lead acid battery grids. The alloy comprises 0.6 to 1.1 weight percent antimony, preferably 0.8 weight percent antimony, 0.06 to 0.25 weight percent arsenic, preferably 0.15 weight percent arsenic, 0.1 to 0.4 weight percent tin, preferably 0.25 weight percent tin, 0.06 to 0.11 weight percent copper, preferably 0.08 weight percent copper, and the balance of lead.

Because the alloy contains some antimony, the formation of non-conducting layers at the grid-active material interface is avoided. However, because the antimony level is reduced, relatively little gassing is observed, thus rendering the alloy suitable for use in maintenance-free batteries. Further, the reduced antimony content increases the conductivity of the alloy, thus increasing cold cranking performance of batteries employing the alloy as grid material.

The alloys of the invention are very fluid and can be cast into fine grain, crack and corrosion resistant battery grids which are as thin as any commercially available. Casting can be effected by conventional grid casting techniques or by continuous grid casting processes.

A comparison was made of 0.055 inch thick grids cast from alloys of the following compositions:

|  | Alloy A (Weight Percent) | Alloy B (Weight Percent) |
| --- | --- | --- |
| Antimony | 0.75 | 0.75 |
| Tin | 0.20 | 0.23 |
| Arsenic | 0.16 | 0.16 |
| Copper | 0.03 | 0.083 |
| Lead | Balance | Balance |

Visual inspection of the grids using 80x magnification indicated that Alloy A had a large grain size with some cracking at grid wire intersections. In contrast, Alloy B, which is within the scope of the present invention, had a markedly reduced grain size and was very resistant to cracking and resultant penetrating corrosion.

Reduction of the antimony content of an alloy for use in battery grids results in an increase in conductivity. This is evidenced by the data in Table I which shows the electrical resistivity of various lead alloys.

TABLE I

| Electrical Resistivity of Various Lead Alloys | |
|---|---|
| Alloy | Electrical Resistivity at 20° C. OHM-cm |
| Pure lead | .00002065 |
| Pure lead & As & Sn & Cu | .0000212 |
| 0.8% Sb Alloy | .00002185 |
| 1.0% Sb—Lead | .0000220 |
| 2.0% Sb—Lead | .0000227 |
| 3.0% Sb—Lead | .0000234 |
| 4.0% Sb—Lead | .0000240 |
| 5.0% Sb—Lead | .0000246 |
| Pb—0.1 Ca—0.3 Sn | .0000219 |

The lead-arsenic-tin-copper alloy is a typical secondary lead alloy. The 0.8% antimony-lead alloy has the composition of Alloy B above. Except for the 0.8% antimony alloy, all resistivity values were derived from the American Society for Metals *Metals Handbook* Vol. I. The 0.8% antimony alloy value was actually measured.

The data indicate that the 0.8% antimony alloy is 11% more conductive than a conventional 5% antimony alloy, 6% more conductive than 2.75% low antimony alloys and equal in conductivity to the Pb-Ca-Sn alloy.

Since corrosion of the antimony from the positive grid and transfer to the negative are the major causes of gassing in batteries, the reduced amount of antimony and the dispersed nature of the antimony particles due to the copper additive will reduce antimony corrosion from the positive grid and concomitant transfer to the negative grid when alloys of the present invention are employed.

A major problem with low antimony alloys has been sufficient strength and rate of strengthening for processing after casting. The presence of arsenic and copper in the alloy of the invention gives the alloy initial hardness and adequate handling strength due to precipitation of the copper and arsenic throughout the alloy.

Table II below shows the rate of aging and ultimate hardness levels of the above 0.8% antimony alloy compared to conventional low antimony alloy, and an alloy of 0.09% Ca-0.3% tin. The alloys were cast into ¼" thick plates and cooled by blowing air over the surface. The hardness was measured by the Rockwell "R" scale (½" D Ball with an applied load of 60 Kg). The duration of the test was 30 seconds.

TABLE II

| Rate of Hardening of Various Alloys After Casting Rockwell "R" Hardness of Alloys | | | |
|---|---|---|---|
| Aging Time After Casting | 2.75% Sb | Pb—0.09 Ca—0.3 Sn | New 0.8% Sb Alloy |
| 1 Minute | 40 | 0 | 10 |
| 5 Minutes | 69 | 22 | 60 |
| 15 Minutes | 80 | 40 | 70 |
| 1 Hour | 82 | 60 | 76 |
| 24 Hours | 86 | 76 | 79 |
| 4 Days | 88 | 78 | 79 |
| 7 Days | 90 | 79 | 79 |
| 14 Days | 92 | 80 | 79 |
| 30 Days | 92 | 83 | 80 |

The first test was conducted one minute after casting. The samples were still hot at this time and this represents the hardening condition of a much thinner battery grid soon after ejection from the mold as it would be handled for trimming. The new 0.8% antimony alloy is slightly stronger than the 0.09% Calcium-0.3% tin alloy since some eutectic and copper second phase particles are present in the structure. The 0.8% Sb alloy, however, is weaker than the conventional low antimony alloy (2.75% Sb) which contains more strengthening antimony eutectic network.

The 0.8% antimony alloy strengthens rapidly as it cools, reaches 95% of its strength in one hour and is virtually fully aged in one day. The 2.75% antimony and the lead-calcium alloys continue to slowly harden. After seven days, the lead-calcium and the 0.8% antimony alloy are at the same hardness, with both alloys softer than the 2.75% antimony alloy. The mechanical properties of the fully aged (30 days) alloys are shown in Table III.

TABLE III

| Mechanical Properties of Various Alloys Aged 30 Days | | | |
|---|---|---|---|
| | 2.75% Sb | 0.09Ca—0.3 Sn | 0.8% Sb |
| UTS (psi) | 7000 | 6500 | 5500 |
| YS (psi) | 5800 | 4800 | 3750 |
| Elongation | 10% | 30% | 30% |

Based on the hardness tests of Table II, the alloy hardens sufficiently after seven days to be processed through casting, trimming, and pasting comparably with the Pb-0.09 Ca-0.3 Sn alloy. After 30 days, the alloy is slightly weaker than the Pb-Ca-Sn alloy and significantly weaker than the conventional low (2.75%) antimony alloy. The reduced strength is due to the reduced antimony content.

Use of copper as the nucleating agent is advantageous in that copper is lost from the alloy during processing less easily than other nucleating agents such as sulfur, selenium and the like. Moreover, where levels of copper are below 0.07 weight percent, processing temperatures as low as 800° F. can be employed.

The presence of arsenic is critical to strength of the alloy for handling purposes. Mechanical properties such as ultimate tensile strength (UTS) and yield strength (YS) would be unacceptably low in its absence. Moreover, arsenic is key to achieving acceptable aging times.

The levels of arsenic and copper in the alloy are each at least 0.06 weight percent to achieve the above-described beneficial properties. At about 0.25 percent arsenic beneficial results are maximized. The maximum copper level is in part a function of the solubility of the copper in the alloy at the processing temperatures employed. Generally, no more than about 0.11 weight percent copper can be used without loss of copper from the alloy.

The presence of at least 0.1 weight percent tin in the alloy is critical to castability. Without tin the flow characteristics of the alloy are unsatisfactory. For example, the alloy may tend to freeze before reaching all portions of the mold. On the other hand, use of greater than 0.4 weight percent results in no significant further enhancement of casting properties and may adversely affect the casting process.

In addition to the above-indicated beneficial properties of the tin and arsenic, both react with the copper to form second phase copper particles. These copper-tin and copper-arsenic particles deposit throughout the alloy and serve to strengthen the alloy and help to refine its grain to a fine, even structure.

Overall, the low antimony alloy of the invention would be significantly more conductive than conventional low antimony alloys containing greater amounts of antimony. Thus cold cranking performance comparable to Pb-Ca-Sn alloy batteries could be achieved. Further gassing rate can be greatly reduced compared to conventional low antimony alloys because of the reduced antimony eutectic content and increased distribution of the antimony. The alloy has sufficient hot strength and aged mechanical properties to be handled in casting and pasting. The reduced antimony content, and the addition of copper produce a reduced freezing range and uniform fine grained, crack-resistant grain structure. Finally, the alloy is very fluid and can be easily cast into the thinnest commercially available grids.

The alloy of the invention may be alloyed and cast according to conventional techniques. Additions of alloying elements to pure lead can be made using pure materials or master alloys, such as lead-antimony-arsenic or tin-copper alloys. After fully blending and making desired adjustments of the composition, the alloy may be poured and molded according to conventional techniques.

The alloy of the invention may contain nucleating agents such as are present in conventional low antimony alloys. For example, sulfur, selenium, cadmium, tellurium, phosphorous and/or aluminum may be incorporated into the alloy of the invention in amounts which do not destroy its mechanical or operational characteristics. However, such additives are not necessary for achieving the above-described beneficial characteristics of the alloy of the invention.

I claim:

1. A lead alloy for use in lead-acid batteries consisting essentially of 0.6 to 1.1 weight percent antimony, 0.06 to 0.25 weight percent arsenic, 0.1 to 0.4 weight percent tin, 0.06 to 0.11 weight percent copper, and the balance lead.

2. The alloy of claim 1 containing 0.8 weight percent antimony, 0.15 weight percent arsenic, 0.25 weight percent tin and 0.08 weight percent copper.

* * * * *